United States Patent [19]

Fye

[11] Patent Number: 5,014,730
[45] Date of Patent: May 14, 1991

[54] KNIFE GATE VALVE

[75] Inventor: Edward H. Fye, Milwaukie, Oreg.

[73] Assignee: Familian Northwest, Portland, Oreg.

[21] Appl. No.: 477,487

[22] Filed: Mar. 13, 1990

[51] Int. Cl.[5] .............................................. F16K 3/02
[52] U.S. Cl. ................................ 137/454.2; 251/326; 251/327; 251/329
[58] Field of Search ............... 251/326, 327, 328, 329; 137/454.2, 454.6

[56] References Cited

U.S. PATENT DOCUMENTS

| 4,112,969 | 9/1978 | Still | 137/454.2 |
| 4,201,365 | 5/1980 | Paptzun et al. | 251/328 |
| 4,603,864 | 8/1986 | Raftis | 251/328 X |
| 4,773,627 | 9/1988 | King et al. | 251/328 |
| 4,798,365 | 1/1989 | Mayhew | 251/326 X |

Primary Examiner—Arnold Rosenthal
Attorney, Agent, or Firm—Robert L. Harrington

[57] ABSTRACT

A knife gate valve wherein the seat for sealing against the knife gate is provided on a separate removable/replaceable carrier portion mounted to the body of the valve. The seat may be a metal rim for metal-to-metal sealing or it may carry a resilient seal. Removable, seat carrying carriers can be provided on both sides of the knife gate for bi-directional control of the slurry flow. The seats may include seals that are sandwiched between the body and the carriers to insure against dislodgement. The seals may include a two-part seal with a non-exposed resilient seal that is urged by a resilient O-ring into bubble tight sealing against the knife gate.

9 Claims, 3 Drawing Sheets

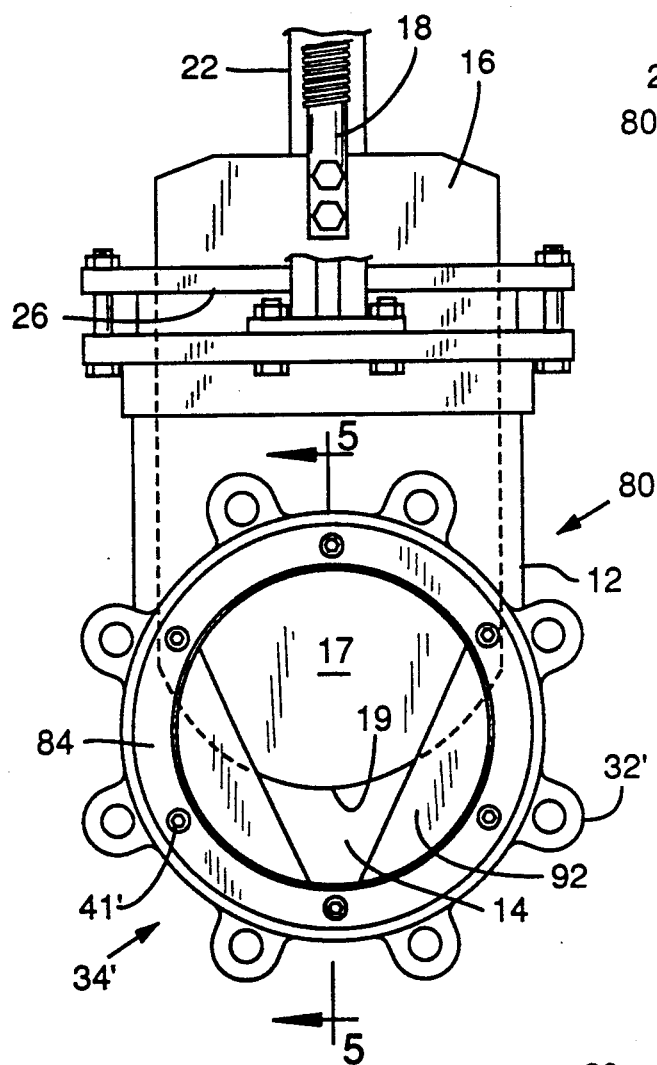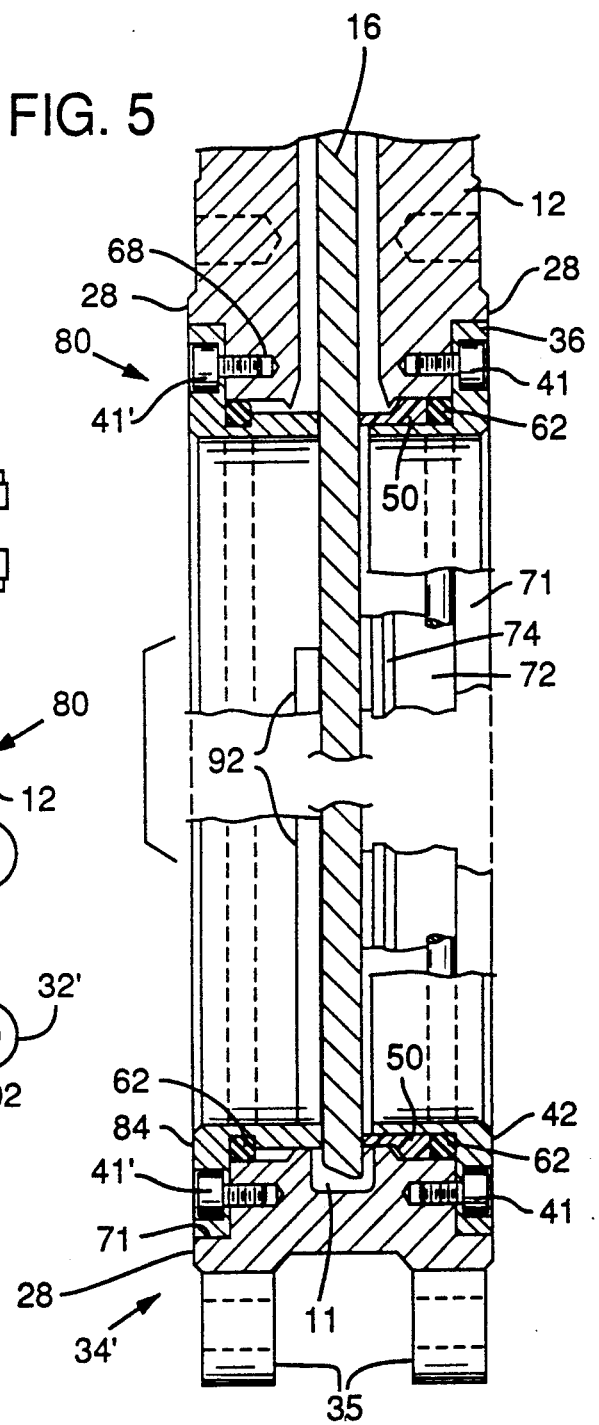

_5,014,730_

KNIFE GATE VALVE

BACKGROUND INFORMATION

1. Field of the Invention

This invention relates to knife gate valves and in particular it relates to an improved sealing arrangement for knife gate valves.

2. Background of the Invention

Knife gate valves as contemplated herein are particularly suited for the paper processing industry for flow control of pulp and related admixtures of material suspended in a liquid sometimes referred to as a slurry. (However, knife gate valves are utilized in all types of liquid media.) The valve has a moveable steel plate referred to as a gate that in the open position is out of the flow path of the slurry. A lower edge portion of the knife gate is beveled to form an edge so that as it is closed, the gate shears through the solids of the slurry.

In one version of the knife gate valve contemplated herein, the gate valve does not have any seal other than the metal gate abutting a metal seat formed in the valve body. The design of the valve relies in part on the pressure of the slurry acting on the gate to force the gate against the seat to effect the seal.

The knife gate valve offers several advantages to a user. It has a low initial cost in comparison to other valve designs, it has a short face to face dimension so it takes up less room in the pipe line and the gate moves totally out of the flow path in the opened position.

The disadvantages of the knife gate valve are that normally the valve will seal or stop the flow of slurry in one direction only. Also, the gate of the valve by design does not provide a tight fit between the gate and the seat. Consequently, with the slurry under low pressure, increased and undesired leaking results.

In the applications where a bubble tight seal is required, (i.e. no leakage) resilient seals are incorporated into the valve. Typically, a strip of resilient material is adhered to the walls along the juncture with the gate edge when the gate is closed. The knife gate is moved into abutment with the resilient material to compress the material and effect bubble tight sealing. However, the cross sectional area of the flow path is reduced by the protruding strip to thereby reduce the flow capacity of the valve, and the seal strip, being in the path of the high pressure slurry flow are subject to rapid wear and damage, e.g. they will tear loose from the valve wall.

Other disadvantages addressed by this invention are the high cost of replacement of the valve, e.g. in the case of a damaged seal, the entire valve needs to be replaced and the need to carry an excessive inventory of the different types of gate valves, e.g. a metal-to-metal unidirectional gate valve, a bubble tight unidirectional gate valve, a bi-directional gate valve, a variable control valve, etc.

SUMMARY

The knife gate valve of the present invention provides the seat portion of the valve on a separate insert or carrier that is replaceable in the valve body. A resilient ring incorporated into the carrier will provide a bubble tight seal with the gate at all operating pressures. However, the carrier and its fit into the valve body is so designed that the seal is retained between the carrier and the body of the valve and is effectively out of the flow path of the slurry flowing through the valve. The carrier can be positioned on both sides of the gate for controlling flow in both directions.

BRIEF DESCRIPTION OF THE DRAWINGS

FIG. 4 illustrates an alternative form of the invention; and

FIG. 5 is a section view taken on view lines 5—5 of FIG. 4.

DESCRIPTION OF THE PREFERRED EMBODIMENT

Figure 1:
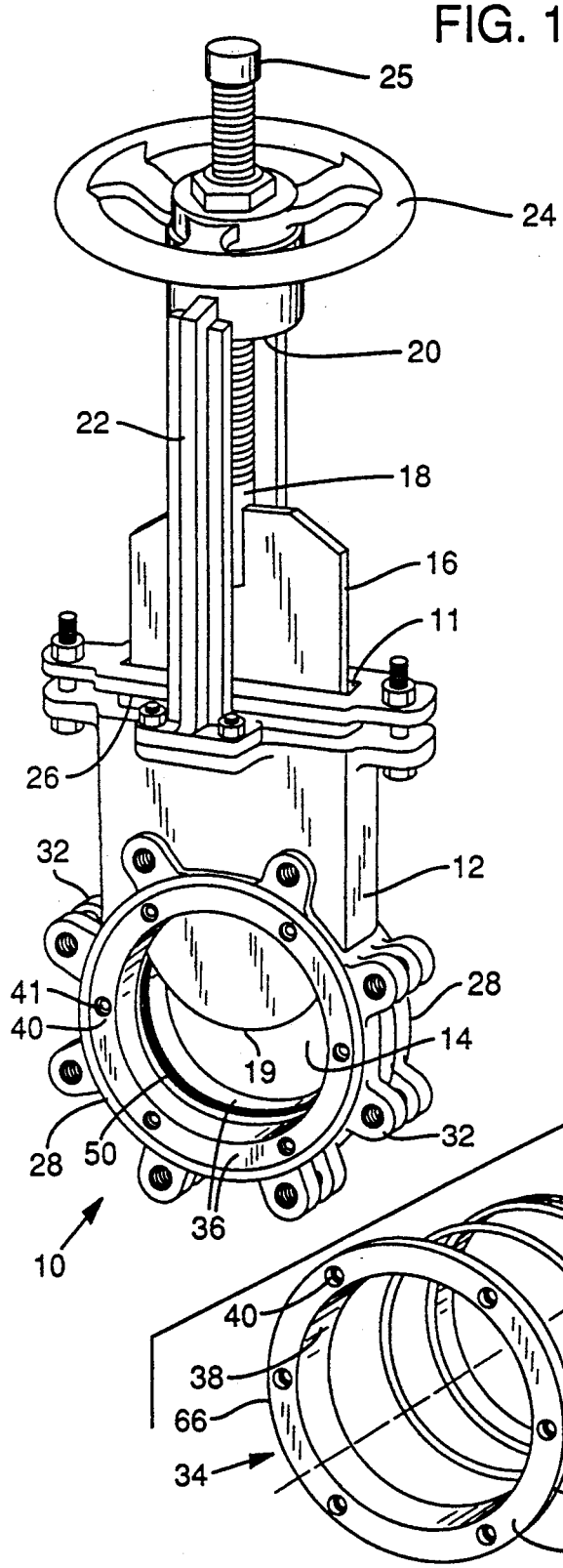
FIG. 1 illustrates a knife gate valve of the present invention.
Figure 2:
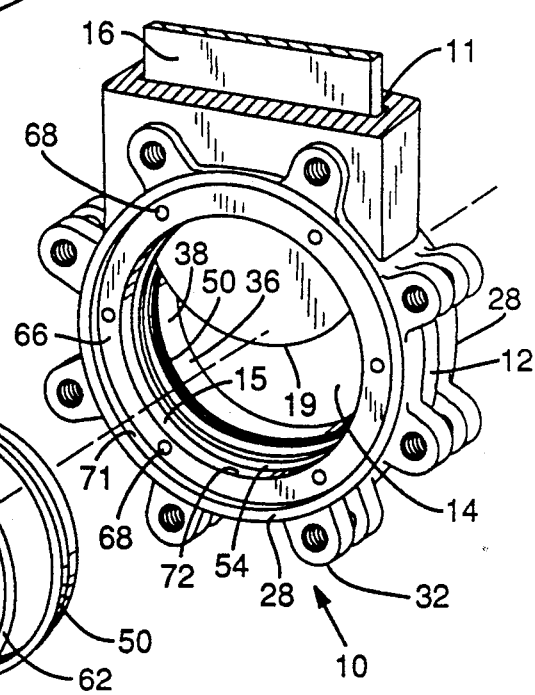
FIG. 2 is an exploded view of the lower body portion of the knife gate valve.
Figure 3:
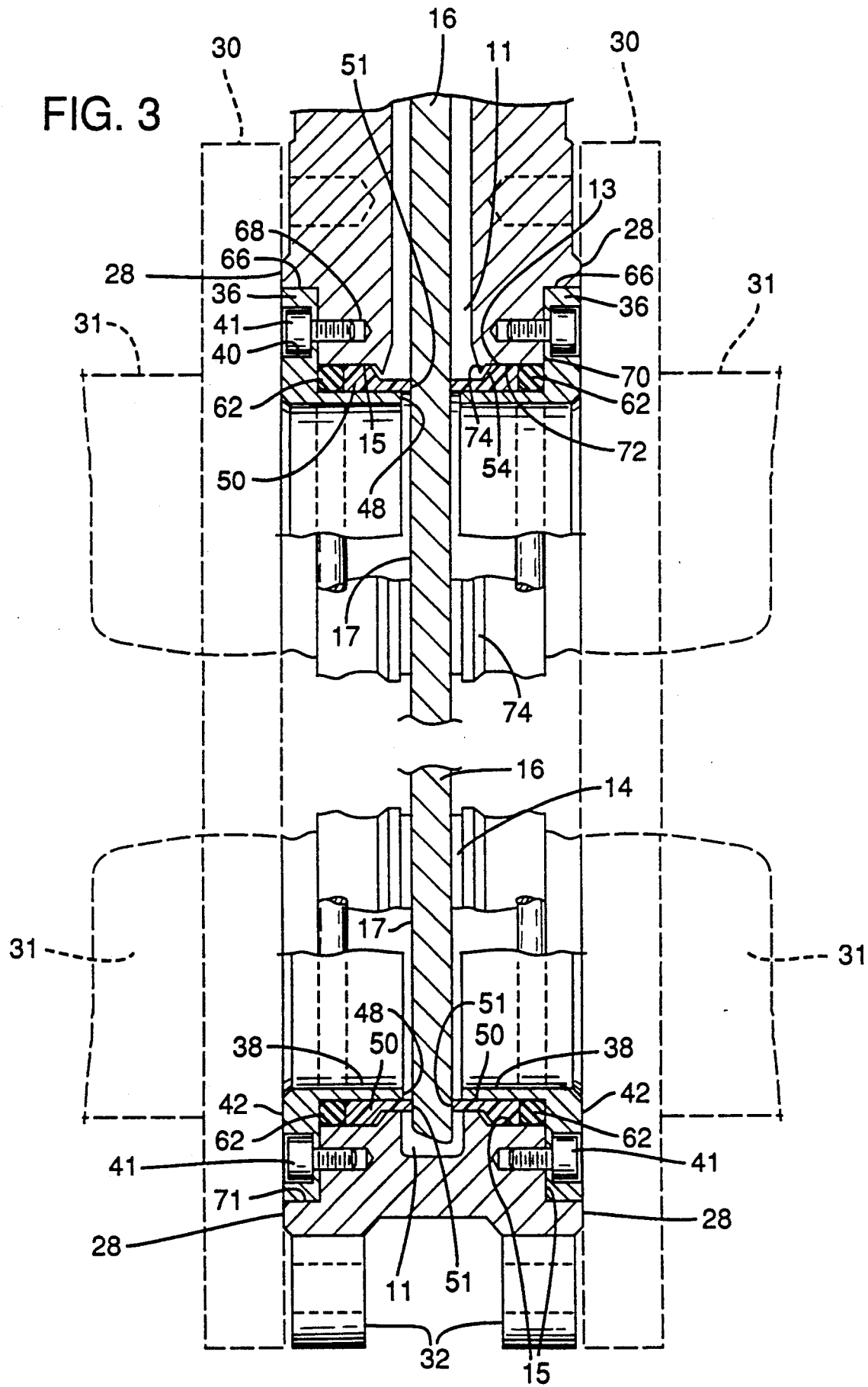
FIG. 3 is an enlarged sectional view of the lower body portion of the knife gate valve, a slurry flow line being illustrated in dash lines.

FIGS. 1–3 illustrate a knife gate valve 10 of the present invention. The basic structure of the valve 10 is well known to the art and has a body 12, preferably of cast stainless steel, that has a through passageway or opening 14 for the flow of material through the valve 10. A shaped opening 11 in the top of the valve body 12 guides a knife gate 16 across the passageway and closes the slurry flow through the passageway 14. The knife gate 16 is preferably of stainless steel.

The upper end of the knife gate 16 is attached to a threaded stem 18, the stem being non-rotatable relative to the knife gate 16. The stem 18 is threadably engaged with a nut 20 that is rotatably retained in a yoke 22 that is affixed to the top of the body 12. A handwheel 24 is joined to the nut 20 to facilitate the rotation of the nut 20 which will impart motion to the stem 18 which in turn moves the knife gate 16 relative to the body 12 and passageway 14 of the valve 10. A stop nut 25 limits the downward stroke of the gate 16 to prevent over-extension of the gate relative to the body.

As is well known, the knife gate 16 is moved into the passageway 14 of the body 12 to stop the flow of material through the valve 10. Packing 26 is provided in the upper portion (often referred to as the packing box or stuffing box) of the body 12 surrounding the knife gate 16 to prevent leakage of slurry through the top of the valve 10. The upper portion of the valve 10 as depicted in FIG. 1 is typical of knife gate valves. While the structure may vary somewhat from manufacturer to manufacturer, the basic concept is the same.

The knife gate 16 in the open position, (it is shown about half way open in FIG. 1) is moved out of the flow path so as not to obstruct the flow of slurry through the pipeline. Also, although a threaded stem 18 connected to a nut 20 is shown as the motion means, other means such as bevel gear drives, pneumatic cylinders, electric motors and other drive means are, or have been, employed to actuate the opening and closing of the valve 10.

The lower portion of the body 12 of the valve 10 as illustrated in FIGS. 1 and 2 and previously discussed, has a passageway 14 that defines a flow path through which the material will flow when the gate 16 of the valve 10 is moved from the closed to the open position. The passageway 14 has at each end, identical rim shaped faces 28 which, when the valve is installed, will abut flanges 30 of pipeline 31. Lugs 32 which are internally threaded are provided to facilitate the mounting of the valve 10 to the adjoining sections of pipeline 31 by threaded fasteners (not shown).

At each end of the valve body 12 within the rim shaped faces 28, the valve body is recessed to provide a profiled inset 15. The insets 15 are each configured to accept the demountable installation of a carrier 34, that in the disclosed version includes a rigid seat 50 (preferably of TEFLON) and a resilient O-ring 62.

As shown, the carrier 34 is ring shaped and has an external flange 36 and an inwardly protruding rim 38 that defines the passageway 14 through the valve 10 (i.e. an eight inch valve will have a carrier 34 with an eight inch inside diameter rim). Multiple countersunk mounting holes 40 are provided in the flange 36 of the carrier 34 to facilitate the mounting of the carrier 34 in the profile inset 15 of the valve body. Threaded fasteners 41, preferably of stainless steel are utilized to fasten the carrier 34 to the valve body. Although holes 40 are provided in the flange to mount the carrier 34 by fasteners 41, they are more for convenience than utility. Once the valve is installed between the flanges of adjoining pipes 31 the carriers are captured at the valve ends and the fasteners are not required. The seat 50 and O-ring 62 are mounted on the rim 38 of the carrier 34. The external surface of seat 50 is contoured to conform to the profile inset 15 in the body of the valve.

As shown in FIG. 3, the assembly of the carrier 34, the seat 50 and the O-ring 62 is installed in each of the profile insets 15 at each end of the passageway 14. The profile 15 is also shown in the exploded view in FIG. 2. The profile of inset 15 has a circular recess 66 dimensioned to accept the flange 36 of the carrier 34. When installed in the inset 15, the surface 42 of the carrier 34 will be flush (i.e. on the same plane) with the face 28. Tapped holes 68 in the bottoms 70 of the recesses 66 are provided for the securement of the carrier 34 within the profile insets 15 by threaded fasteners 41.

From FIG. 3, the profile 15 has a beveled area 74 that matches a corresponding beveled surface 54 of the seat 50. The abutment of the bevel surface 54 of the seat 50 contacting the beveled area 74 limits the movement of the seat 50 in the direction toward the center of the valve body 12.

With this construction, the sealing members 50, 62 are captured between carrier 34 and the valve body 12. The O-ring 62 is resilient, (i.e. compressible) and is compressed during installation (of the assembly of the carrier 34, rigid seat 50 and the O-ring 62) to provide a biasing force to urge the seat 50 toward the center of the valve body 12. The O-ring 62, in addition to providing the biasing force, provides a seal between the carrier 34 and the body 12. As shown in FIG. 3, the edge 51 of seat 50 extends beyond the end 48 of the carrier rim 38. The end 51 of seat 50 is forcibly urged to be in contact with the face 17 of the knife gate 16 by the biasing force of the compressed O-ring 62. Note that when the knife gate is in the passageway 14, the end 51 in contact with the face 17 has moved the seat 50 against the O-ring 62, thus further compressing the O-ring 62 which provides added biasing force urging the seat 50 against the face 17 of the knife gate 16. As shown in FIG. 3, the beveled surface portion 54 of the seat 50 is spaced from the beveled area 74 of the profile inset 15. When the knife gate 16 is moved out of the passageway 14 (i.e. to the open position), the end 51 no longer contacts the face 17 of the knife gate and the biasing force caused by the compression of the O-ring 62 urges the seat 50 toward the center of the valve. The movement of the seat 50 is limited by the abutment of the beveled portion 54 with the bevel area 74.

The arrangement of a sealing seat 50 installed on each side of the knife gate 16 provides a knife gate valve 10 that will control the flow of fluid in both directions. The biasing force urging the seat 50 against the knife gate face 17 provides a bubble tight seal. If the pressure in the system is sufficient to cause movement of the knife gate 16, i.e. deflection of the knife gate 16, the seal on the opposite side of the gate becomes tighter due to the increased biasing force caused by the movement of the gate 16 against the seat 50 which further compresses the O-ring 62.

As shown in the alternate embodiment of FIG. 4, the unique arrangement of the replaceable carrier assembly also provides for the adaptation of a novel flow control valve 80. The carrier 34' of flow control valve 80 replaces the assembly of the carrier 34, seat 50 and O-ring 62 of the FIG. 1 valve. Carrier 34' is similar in construction to the carrier 34, but without the sealing member 50. (O-ring 62 is optionally provided.) The carrier is simply configured to fit profile 15 of the valve body, the same valve body described for the embodiment of FIGS. 1-3. Fixedly attached within the passageway 14 of the carrier 34' are V sections 92. As shown in the figure, the V sections are chordal segments that close the passageway down to a V shaped cross section. The sections 92 in cooperation with the bottom edge 19 of the knife gate 16 provide a triangular opening through the carrier 34' and thus through the valve. In a known manner, the control valve 80 may be automatically controlled to precisely control the volume of slurry permitted through the valve enabled in part by the triangular cross section of the passageway.

A further alternate embodiment is to provide a carrier similar to that of FIG. 4 but without the V sections 92. The rim of the carrier produces a metal-to-metal seal as can be seen in FIG. 5. The metal-to-metal seal is sometimes preferred.

The embodiments as set forth herein provide a knife gate valve with replaceable carriers. Should a seat of a carrier become damaged, the carrier is merely replaced at a fraction of the cost of a complete valve. In that all of the variations can utilize the same valve body, inventory requirements are also greatly reduced. That is, whatever type of valve is required, fitting the universal valve body with the appropriate carrier will satisfy that requirement. Finally, removing the resilient seal from direct exposure to the slurry flow greatly enhances the operating life of the seal.

Variations and modifications to the preferred embodiments will be apparent to those skilled in the art. The scope of the invention is, therefore, not to be limited to the embodiments set forth but is to be determined by the appended claims.

What is claimed is:

1. A knife gate valve comprising; a body having a passageway therethrough, means for mounting the body into a flow line carrying a liquid media under pressure whereby the liquid media flows through the passageway in the body, a gate seat formed in the body and surrounding the passageway, a knife gate having a leading edge, said body having a guide opening for guiding the knife gate across the passageway and into seating engagement with the gate seat, control means for controlling movement of the knife gate in the guide opening to selectively close and open the passageway to the liquid media flow, said gate seat being provided on a separate carrier portion of the body through which the passageway extends and said gate seat surrounding the passageway through the carrier portion, releasable fastening means independent of said mounting means for removably fastening said carrier portion to the body whereby removal and replacement of the carrier portion accomplishes replacement of the gate seat in the valve.

2. A knife gate valve as defined in claim 1 wherein two removable carrier portions with gate seats are provided in the two ends of the body, one on each side of the knife gate when in the closed position.

3. A knife gate valve as defined in claim 1 wherein the gate seat is a metal rim surrounding the passageway through the carrier for engaging the knife gate in metal-to-metal sealing engagement.

4. A knife gate valve as defined in claim 3 wherein the passageway through the carrier is V shaped and forms a triangular opening, the third side of which is formed by the bottom edge of the gate knife that is moved toward and away from the apex of the V to predictably control flow of slurry therethrough.

5. A knife gate valve as defined in claim 1 wherein the knife gate leading edge is beveled to form a cutting edge for cutting through the slurry in progressing across said passageway to close the flow of slurry therethrough.

6. A knife gate valve as defined in claim 1 wherein the carrier portion comprises a metal rim formed around the passageway therethrough, and a separate sealing member surrounding the metal rim and protruded past the rim and into sealing engagement with the knife gate.

7. A knife gate valve as defined in claim 6 wherein the body includes an inset that is profiled to receive the carrier, said inset fitting over and around the sealing member to trap the sealing member between the inset and the metal rim of the carrier and thereby prevent dislodgement of the sealing member due to liquid media flow.

8. A knife gate valve as defined in claim 7 wherein the sealing member includes two cooperative parts, a resilient ring forming one part and a rigid ring forming the second part, said rigid ring engaging the knife gate and transmitting force on the resilient ring to collapse the resilient ring against the carrier portion.

9. A knife gate valve comprising; a body having a passageway therethrough, and an exterior face portion surrounding the entry to said passageway, means for mounting the body into a flow line with the flow line abutting the exterior face, said flow line carrying a liquid media under pressure whereby the liquid media flows through the passageway in the body, a gate seat formed in the body and surrounding the passageway, a knife gate having a leading edge, said body having a guide opening for guiding the knife gate across the passageway and into seating engagement with the gate seat, control means for controlling movement of the knife gate in the guide opening to selectively close and open the passageway to the liquid media flow, said gate seat being provided on a separate carrier portion of the body through which the passageway extends and said gate seat surrounding the passageway through the carrier portion, said carrier portion separated from and positioned within the exterior face of the body, said carrier portion removably mounted to the body whereby removal and replacement of the carrier portion accomplishes replacement of the gate seat in the valve.

* * * * *